April 5, 1966 J. A. BUCCI ETAL 3,244,854
STORED ENERGY STUD WELDER
Filed Aug. 24, 1962 2 Sheets-Sheet 1

INVENTORS
RONALD F. BRENNEN
& JAMES A. BUCCI
BY
Bierman & Bierman
ATTORNEYS

April 5, 1966  J. A. BUCCI ETAL  3,244,854
STORED ENERGY STUD WELDER
Filed Aug. 24, 1962  2 Sheets-Sheet 2

INVENTORS.
RONALD F. BRENNEN
& JAMES A. BUCCI.
BY
Bierman & Bierman
ATTORNEYS

United States Patent Office 3,244,854
Patented Apr. 5, 1966

3,244,854
STORED ENERGY STUD WELDER
James A. Bucci and Ronald F. Brennen, Brooklyn, N.Y., assignors to Uniweld Products, Inc., Fort Lauderdale, Fla., a corporation of Delaware
Filed Aug. 24, 1962, Ser. No. 219,266
6 Claims. (Cl. 219—98)

This invention relates to an electric welder for welding two metallic conductors to each other by the use of an electric charge stored in a capacitor. The invention has particular reference to a circuit means for discharging the storage capacitor without the use of a discharge switch.

Many welding circuits have been devised and used wherein the discharge from a storage capacitor is employed to furnish the electrical current pulse which melts one or both portions of a pair of elements which are to be joined together. In all of these circuit arrangements some form of switching means is necessary for completing the circuit between the capacitor and the portions to be welded. Such a switch introduces considerable resistance into the circuit and reduces the efficiency of the welding process. The reason for this resistance is due to the fact that the main portion of the welding current starts to flow when the switch is first closed and only a minute area between switch elements conducts the first surge of the current. The present invention uses no such switch but instead connects the two portions to be welded by means of a solenoid and thereby permits the storage capacitor to discharge its full current without any resistance in the circuit except the contacts to be welded. In this manner all the heat available from the passage of the current pulse is concentrated at the welding spot where it is most needed.

One of the objects of this invention is to provide an improved electric welder which avoids one or more of the disadvantages and limitations of prior art welders.

Another object of the invention is to increase the efficiency of electric welding circuits.

Another object of the invention is to eliminate the usual high current triggering switch generally necessary in prior art circuits.

Another object of the invention is to eliminate poor welds by requiring a predetermined voltage across the storage capacitor before the welding operation starts.

Another object of the invention is to provide a solenoid for seating the weld portions together with considerable mechanical force.

The invention comprises an electric welder using a source of direct current power to charge a first storage capacitor during a charging interval. This capacitor is connected to two conductive elements which are to be welded together during a discharge interval. A voltage sensing means is connected across the first storage capacitor for determining when the capacitor has been sufficiently charged. This sensing means controls a motor means which moves the two elements into contact with each other for welding. One feature of the invention includes a voltage sensitive relay with its winding connected across the storage capacitor and with its contacts connected in series with the potential source and one side of the capacitor. Another feature of the invention includes a second storage capacitor which is charged during the charging interval and discharged through the winding of a solenoid during the discharge interval to bring the two elements together.

For a better understanding of the present invention, together with other and further objects thereof, reference is made to the following description taken in connection with the accompanying drawings.

Figure 1:
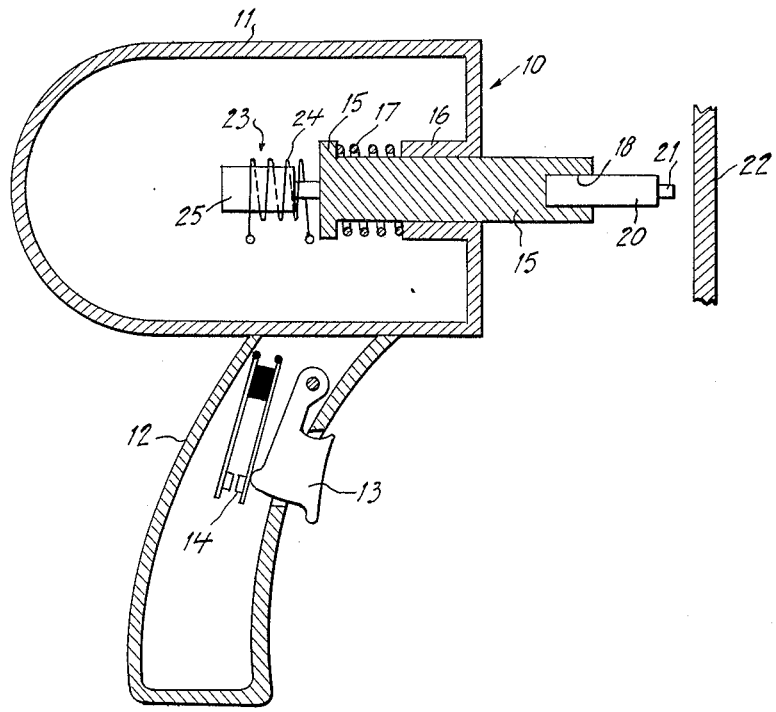
FIG. 1 is a cross sectional view of a welder's gun which may be employed to weld a stud to a plate. Only the motor portions and the trigger switch are shown in this figure.

Referring now to FIG. 1, a welder's gun 10 includes a main case 11 and a handle 12. In the handle, a trigger 13 is pivotally supported and makes contact with a trigger switch 14. The trigger 13 is designed for manual operation. Within the body of casing 11 a plunger 15 is slidably mounted in a casing 16 and is restrained by a helical spring 17. The external end of the plunger is formed with a recess 18 into which a stud 20 may be positioned. The stud 20 may be formed with a small tip 21 which first conducts current when it comes in contact with plate 22. The plunger 15 is moved to its operating position by a solenoid 23 which includes a winding 24 and a solenoid plunger 25.

Figure 2:
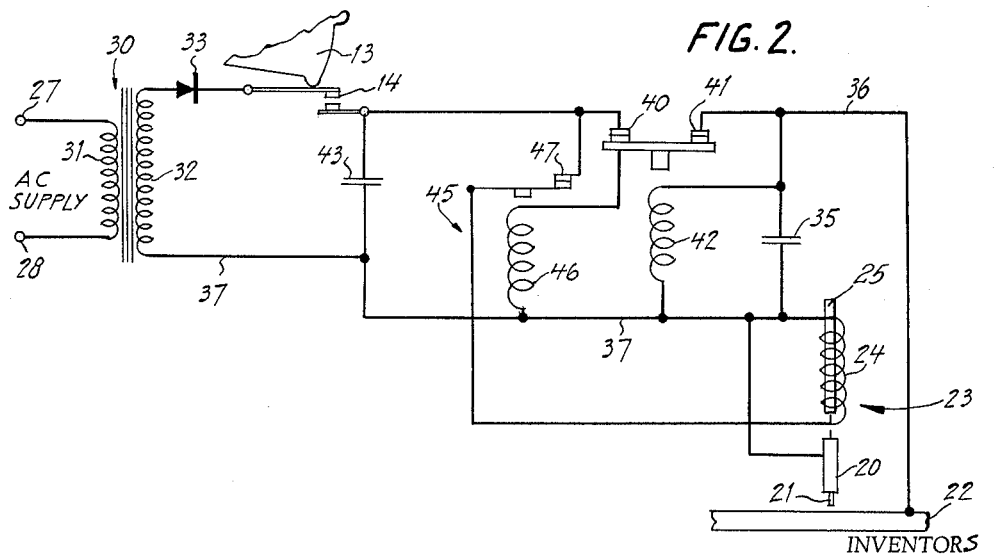
FIG. 2 is a schematic diagram of connections showing the entire welding circuit.

The circuit details of one form of the welder are shown in FIG. 2 and include input terminals 27 and 28 which are to be connected to a source of alternating current power. A transformer 30 is generally employed to increase the voltage to a desired value but this is not always necessary. The transformer primary winding 31 is connected to the input terminals while the secondary winding 32 is connected in series with a rectifier 33 and the manually operated switch 14. It is obvious that transformer 30 is not necessary if the voltage of the supply line is sufficiently high to operate the welder. It is also obvious that the alternating current supply plus the rectifier may be replaced by a direct current supply of the desired voltage.

The actual welding is accomplished by the charge stored in a first capacitor 35 which discharges its stored energy over conductors 36 and 37 to the plate 22 and the stud 20. The first storage capacitor 35 is charged by the rectified current which passes through rectifier 33, switch 14, and two normally closed relay contacts 40 and 41 which are part of a voltage sensitive relay having a winding 42 bridged across the capacitor 35.

A second storage capacitor 43 is connected directly across the terminals of the supply circuit and is charged to full capacity in a relatively short time interval after switch 14 is closed. The charging voltage of this capacitor is indicated by curve 44 in FIG. 4, the time of charge being limited only by the resistance in winding 32 and rectifier 33. A second relay 45, which shall be called a current relay to distinguish it from the voltage operated relay, has a winding 46 connected between one of the contacts 40 and the common conductor 37. This relay also includes a pair of normally closed contacts 47 which are connected in series with the solenoid winding 24. Capacitor 43 supplies electrical power to the solenoid winding prior to the welding action.

Figure 4:
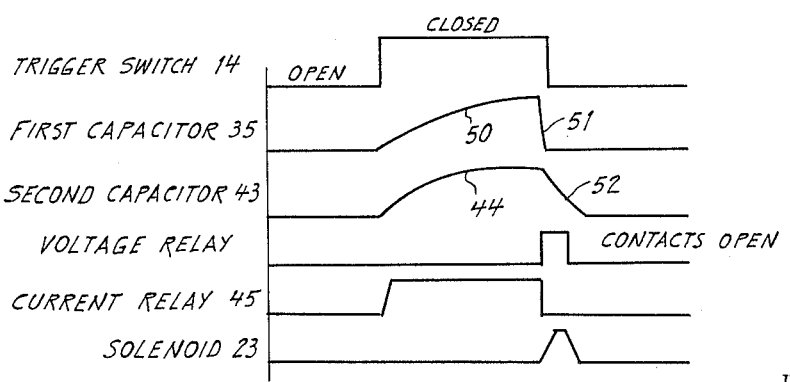
FIG. 4 is a timing diagram which indicates the sequential operation of some of the important elements in the circuit of FIGURE 2.

The operation of this device is as follows: With the tip 21 separated from plate 22, trigger 13 is operated, and switch 14 is closed, thereby applying direct current power to conductors 36 and 37. Capacitor 43 is charged quickly as is indicated by curve 44 in FIG. 4. Capacitor 35 is charged more slowly because of its greater capacity, this rate of charge being indicated by curve 50 in FIG. 4. As soon as switch 14 is closed, current flows through contacts 40 and winding 46 of current relay 45 to operate its armature and open contacts 47. The opening of these contacts removes electrical power from solenoid 24 which otherwise might be operated. The first capacitor 35 continues to charge until a predetermined voltage is reached and this voltage is sensed by winding 42 which operates at the predetermined voltage and opens contacts 40 and 41. When contacts 41 are opened, capacitor 35 is disconnected from the charging circuit and when contacts 40 are opened current through winding 46 is cut off and contacts 47 are closed. The charge in the second storage capacitor 43 now flows through contacts 47 and solenoid winding 24 to operate the solenoid and make contact between the stud 20 and plate 22, thereby permitting the charge in first capacitor 35 to flow through the two elements 21 and 22 and weld them together. The welding operation is now complete and solenoid plunger 25 is returned to its normal position by spring 17 because the current which operates the solenoid comes from the second storage capacitor and is of short duration. In FIG. 4, the discharge curve 51 of the first capacitor is quite steep since the only resistance in the discharge path is the contact between the elements to be welded. The discharge of the second capacitor is indicated in FIG. 4 by curve 52 and consumes a greater time interval because the discharge moves through the inductive winding 24. The trigger switch 14 may be opened by the operator any time after the capacitors 35 and 43 have been charged.

Figure 3:
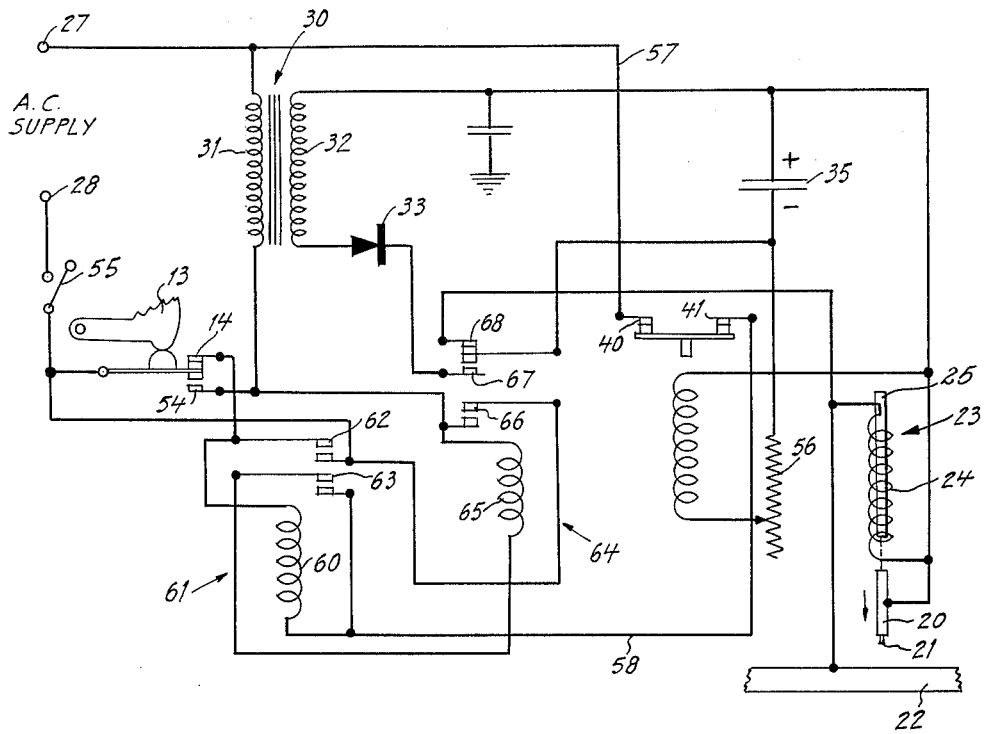
FIG. 3 is a schematic diagram of connections of an alternate form of the welder.

The circuit shown in FIG. 3 is an alternate circuit having an additional relay but with added protection which insures the completion of the welding cycle even if the operator releases the trigger switch before the cycle is complete. The circuit includes input terminals 28 and 29, and a trigger switch 13 as before. Transformer 30 has its primary winding 31 connected between terminals 27 and an added contact 54 under the trigger switch 14. An activating switch is connected in series with the second input terminal 28. This switch is used to cut off all power when the welder is not in use. The storage capacitor 35 stores the charge for the welding operation but in this circuit it is connected in series with an adjustable resistor 56 which can be altered to vary the stored charge and the welding current.

The voltage sensitive relay having a winding 42 and a double break set of contacts 40 and 41 is substantially the same as the relay shown in FIG. 2 except that the external wiring has been changed to conform with the alternate operation cycle. Contacts 40 and 41 are each connected in series with conductors 57 and 58. Conductor 57 is connected directly to input terminal 27 while conductor 58 is connected to one side of winding 60 and one of the contacts 63. Relay 61 includes two normally open contacts 62, 63 and is a locking relay employed to complete the welding action after it has been started. A third relay 64 includes a winding 65, two pairs of normally open contacts 66 and 67 and one pair of normally closed contacts 68. This relay is actuated when contacts 63 on relay 61 are closed. Relay 64 causes the storage capacitor 35 to be charged by secondary winding 32 through contacts 67. The connections of the solenoid array 23 are substantially as described above in connection with FIG. 2.

The operation of this circuit is as follows: With switch 55 open, no current flows in the circuit. When switch 55 is closed, relay 61 is actuated directly from the A.C. supply terminals by a circuit which can be traced from terminal 28, through switch 55, contacts 14, winding 60, conductor 58, contacts 41 and 40, and conductor 57 to terminal 27. When relay 61 is actuated, contacts 62 and 63 are closed, contacts 62 being connected across contacts 14 and thereby locking the relay against normalizing when contacts 14 are opened. Next, when the manually operated trigger switch is actuated, contacts 14 are opened and contacts 54 are closed, thereby sending current to winding 65 of relay 14 and connecting the primary winding 31 of transformer 30 across the input terminals. Current now flows from the transformer secondary winding 32, through rectifier 33, closed contacts 67 to charge storage capacitor 35. Capacitor 35 is not charged at once because of the resistance in the secondary winding 32 and because of its large capacity. During the charging period, the voltage sensitive relay is not actuated because the voltage across its winding is not large enough. When storage capacitor is charged to a predetermined desired voltage, the voltage sensitive relay is actuated and contacts 40 and 41 are opened, thereby cutting off the current supply to windings 60 and 65. Contacts 62 and 63 on relay 61 are opened; also, contacts 66 and 67 on relay 64 are opened and contacts 68 are closed, thereby closing a circuit which places the solenoid winding 24 across capacitor 35. The solenoid moves the stud 20 into contact with plate 22 and the remainder of the charge in storage capacitor 35 forms the weld.

It should be noted that, once switch 13 has been actuated, relay 61 is locked in its actuated condition, and the welding cycle is completed even if switch 13 is normalized before the end of the cycle.

From the above description it will be evident that the electric welder welds two conductive elements to each other with a minimum of circuit resistance. The circuit operates in an efficient manner to perform the welding operation in a very short time interval after the operator depresses the trigger.

The foregoing disclosure and drawings are merely illustrative of the principles of this invention and are not to be interpreted in a limiting sense. The only limitations are to be determined from the scope of the appended claims.

We claim:

1. An electric welder for welding two conductive elements to each other comprising, in combination, a source of direct current power, a manually operated switch, a storage capacitor, said storage capacitor being connected to said source in series with said manually operated switch, said storage capacitor receiving an electric charge during a charging interval, said storage capacitor also being connected to said two conductive elements to be welded to each other during a discharge interval, voltage sensing means for determining when said storage capacitor has been charged, said voltage sensing means being connected across said storage capacitor, and motor means for moving said two conductive elements into contact with each other, said motor means being operatively associated with and under the control of said voltage sensing means, whereby said storage capacitor discharges without the use of a discharge switch thereby discharging its full current without any circuit resistance except that of the two conductive elements to be welded.

2. An electric welder for welding two conductive elements to each other comprising, in combination, a source of direct current power, a manually operated switch, a storage capacitor, said storage capacitor being connected to said source in series with said manually operated switch, said storage capacitor receiving an electric charge during a charging interval, said storage capacitor also being connected to said two conductive elements to be welded to each other during a discharge interval, voltage sensing means for determining when said storage capacitor has been charged, said voltage sensing means being connected across said storage capacitor, said voltage sensing means including at least a pair of relay contacts and a winding, and motor means for moving said two conductive elements into contact with each other, said motor means being operatively associated with and under the control of said voltage sensing means, whereby said storage capacitor discharges without the use of a discharge switch thereby discharging its full current without any circuit resistance except that of the two conductive elements to be welded.

3. An electric welder as claimed in claim 2 wherein said motor means is a solenoid.

4. An electric welder as claimed in claim 3 wherein said solenoid includes a winding, said winding being connected in series with said pair of relay contacts.

5. An electric welder for welding two conductive elements to each other comprising, in combination, a source of alternating current power, a rectifying circuit, a manually operated trigger switch, said rectifying circuit being coupled to said source and being in series with said switch, a first storage capacitor, voltage sensing means for determining when said first storage capacitor has been charged to a predetermined voltage, said voltage sensing means including a winding and two pairs of relay contacts, said first storage capacitor being connected to said rectifying circuit through said two pairs of relay contacts, whereby said first storage capacitor is charged during a charging interval, said first storage capacitor also being connected to said two conductive elements to be welded during a discharge interval, said winding being connected across said first storage capacitor and being arranged to open said relay contacts after said first storage capacitor has been charged to a predetermined voltage, a second storage capacitor, a pair of current relay contacts, a relay winding, said second storage capacitor being connected to said rectifying circuit, whereby said second storage capacitor is charged during a charging interval, said relay winding being connected across said second storage capacitor and in series with said pair of current relay contacts and in series with one of said relay contacts of said voltage sensing means, said current relay contacts being arranged to open upon the closing of said manually operated switch, a solenoid workpiece-moving element, and a solenoid winding means for operating said element during a discharge interval, said solenoid winding means being operatively associated with said solenoid workpiece-moving element, whereby said storage capacitors discharge without the use of a discharge switch thereby discharging their full current without any circuit resistance except that of the two conductive elements to be welded.

6. An electric welder for welding two conductive elements to each other comprising, in combination, a source of alternating current power, a rectifying circuit, a manually operated trigger switch, said rectifying circuit being coupled to said source and being in series with said switch, a first storage capacitor, voltage sensing means for determining when said first storage capacitor has been charged to a predetermined voltage, said voltage sensing means including a winding and two pairs of relay contacts, said first storage capacitor being connected to said rectifying circuit through said two pairs of relay contacts, whereby said first storage capacitor is charged during a charging interval, said first storage capacitor also being connected to said two conductive elements to be welded during a discharge interval, said winding being connected across said first storage capacitor, a second storage capacitor, a pair of current relay contacts, a relay winding, said second storage capacitor being connected to said rectifying circuit, whereby said second storage capacitor is charged during a charging interval, said relay winding bing connected across said second storage capacitor and in series with said pair of current relay contacts and in series with one of said relay contacts of said voltage sensing means, a solenoid workpiece-moving element, and a solenoid winding means for operating said element during a discharge interval, said solenoid winding means being operatively associated with said solenoid workpiece-moving element, whereby said storage capacitors discharge without the use of a discharge switch thereby discharging their full current without any circuit resistance except that of the two conductive elements to be welded.

References Cited by the Examiner
UNITED STATES PATENTS

| | | | |
|---|---|---|---|
| 1,327,814 | 1/1920 | Fortescue | 219—95 |
| 2,510,101 | 6/1950 | Graham | 219—95 |
| 2,537,990 | 1/1951 | Graham | 219—113 |
| 2,617,086 | 11/1952 | Willemse | 219—113 X |
| 2,763,755 | 9/1956 | Graham | 219—98 |
| 3,073,946 | 1/1963 | Hazel | 219—95 |
| 3,108,178 | 10/1963 | Kelemen et al. | 219—113 X |

RICHARD M. WOOD, *Primary Examiner.*